(12) United States Patent
Angermann

(10) Patent No.: US 7,886,810 B2
(45) Date of Patent: Feb. 15, 2011

(54) HIGH-TEMPERATURE SOLDERED EXHAUST HEAT EXCHANGER

(75) Inventor: Hans-Heinrich Angermann, Stuttgart (DE)

(73) Assignee: Behr GmbH & Co. KG, Stuttgart (DE)

( * ) Notice: Subject to any disclaimer, the term of this patent is extended or adjusted under 35 U.S.C. 154(b) by 1013 days.

(21) Appl. No.: 10/579,192

(22) PCT Filed: Nov. 10, 2004

(86) PCT No.: PCT/EP2004/012714

§ 371 (c)(1), (2), (4) Date: Aug. 16, 2006

(87) PCT Pub. No.: WO2005/050118

PCT Pub. Date: Jun. 2, 2005

(65) Prior Publication Data

US 2007/0039722 A1  Feb. 22, 2007

(30) Foreign Application Priority Data

Nov. 14, 2003 (DE) ................. 103 53 577

(51) Int. Cl.
F28F 9/02 (2006.01)
F28F 19/02 (2006.01)

(52) U.S. Cl. ...................... 165/158; 228/183
(58) Field of Classification Search ........ 165/157, 165/158, 133; 29/890.03; 228/183
See application file for complete search history.

(56) References Cited

U.S. PATENT DOCUMENTS

| | | | |
|---|---|---|---|
| 4,473,110 A * | 9/1984 | Zawierucha | ........... 165/133 |
| 4,781,888 A | 11/1988 | Hagiwara et al. | |
| 4,785,092 A | 11/1988 | Nanba et al. | |
| 5,172,849 A | 12/1992 | Barten et al. | |
| 5,915,472 A | 6/1999 | Takikawa et al. | |
| 6,076,727 A * | 6/2000 | Evans et al. | ........... 228/183 |
| 6,129,143 A * | 10/2000 | Hasegawa et al. | ........... 165/133 |
| 6,257,483 B1 * | 7/2001 | Inaba | ........... 228/262.42 |
| 6,543,675 B1 * | 4/2003 | Laudic et al. | ........... 228/183 |
| 6,904,961 B2 * | 6/2005 | Ayres | ........... 165/133 |
| 2003/0010480 A1 | 1/2003 | Shibagaki et al. | |

FOREIGN PATENT DOCUMENTS

| | | |
|---|---|---|
| CN | 1305086 A | 7/2001 |
| DE | 35 18 408 C2 | 11/1985 |
| DE | 35 25 168 C2 | 2/1986 |
| DE | 690 11 438 T2 | 12/1994 |
| DE | 197 21 132 A1 | 11/1997 |
| DE | 692 29 813 T2 | 4/2000 |
| DE | 102 31 973 A1 | 2/2003 |

(Continued)

Primary Examiner—Tho v Duong
(74) Attorney, Agent, or Firm—Muncy, Geissler, Olds & Lowe, PLLC

(57) ABSTRACT

A heat exchange device includes a first flow path for a first fluid and a second flow path for a second fluid, and the components of the inventive heat exchanger are interconnected by a connection material. Connections that are substantially directly exposed to the flow of the first fluid are formed of a first connection material and connections that are not directly exposed to the flow of the first fluid are formed of a second connection material. The composition of the first and the second connection material is different.

21 Claims, 3 Drawing Sheets

FOREIGN PATENT DOCUMENTS

| | | |
|---|---|---|
| DE | 600 01 882 T2 | 12/2003 |
| EP | 0 414 447 A1 | 2/1991 |
| EP | 0 514 946 A2 | 11/1992 |
| EP | 1 094 291 A2 | 4/2001 |
| EP | 1 153 690 A1 | 11/2001 |
| JP | 9-089491 | 4/1997 |
| JP | 2000-171178 A | 6/2000 |
| JP | 2000-218390 | 8/2000 |
| JP | 2001116483 A * | 4/2001 |
| JP | 2002-295991 A | 10/2002 |

* cited by examiner

HIGH-TEMPERATURE SOLDERED EXHAUST HEAT EXCHANGER

FIELD OF THE INVENTION

The present invention relates to an apparatus for exchanging heat. In particular, the present invention relates to an exhaust gas heat exchanger for motor vehicles.

BACKGROUND OF THE INVENTION

Heat exchanger apparatuses nowadays play an increasingly important role in many fields of engineering, in particular automotive engineering, in power plants and in environmental engineering. The components of heat exchanger apparatuses of this type are usually connected or joined to one another by means of welding or soldering.

The joining by means of soldering often takes place using what is known as a nickel solder (Ni solder). A nickel solder of this type is distinguished by a high resistance to oxidation and corrosion, but has the drawbacks compared to other solders, such as for example copper solders (Cu solder) that the soldering gap usually has to be at least narrower than 0.1 mm in order to prevent the formation of precipitation products in the soldered seam, which reduce the strength and/or increase the corrosion, that all Ni solders are relatively expensive and that to avoid oxidation of the solder surface, the soldering process is usually carried out in a vacuum soldering furnace, which means that the mass production of nickel-soldered heat exchangers of this type, on account of the process times required in a vacuum soldering furnace, is relatively complex and therefore also expensive.

However, the use of Cu-soldered heat exchanger apparatuses represents a problem in many fields, since Cu solder at times does not have the required resistance to corrosion or oxidation in particular when exposed to the fluids flowing through the heat exchanger apparatus, and consequently it may be damaged at the joint seams, in particular as a result of corrosion or oxidation.

SUMMARY OF THE INVENTION

Therefore, it is an object of the present invention to provide an apparatus for exchanging heat and a process for producing an apparatus of this type, which overcomes the drawbacks of the prior art.

Accordingly, the apparatus according to the invention for exchanging heat (heat exchanger) has at least one first flow path for a first fluid, which is at least partially delimited by at least one first delimiting element, and a second flow path for a second fluid, which is at least partially delimited by at least one second delimiting element. Exchange of heat takes place between the first fluid and the second fluid.

Moreover, the heat exchanger according to the invention has a first diffusor space, which is connected upstream of the first flow path and is flow-connected to at least one first connection piece, through which the first fluid flows into the first diffusor space. The first diffusor space is at least partially delimited by at least one third delimiting element. Furthermore, there is a second diffusor space, which is connected downstream of the first flow path and is at least partially delimited by a fourth delimiting element, the second diffusor space being flow-connected to at least one second connection piece, through which the first fluid flows out of the diffusor space.

At least one third and one fourth connection piece, through which the second fluid is fed to and discharged from the second flow path, are flow-connected to the second flow path.

The heat exchanger according to the invention also has a separating element on the entry and exit sides of the first flow path, which separating element substantially prevents the first fluid from entering the second flow path and/or the second fluid from entering the first flow path, this separating element being connected in a sealing manner to the first and second delimiting elements. The third delimiting element is connected in a sealing manner to the first or second delimiting element or to the separating element.

According to the invention, the sealing connections are cohesive connections, at least those connections in which the material forming the cohesive join is substantially directly exposed to the flow of the first fluid comprising a first connecting material and connections in which the material which forms the cohesive join is not or not directly exposed to the flow of the first fluid comprising a second connecting material, the compositions of the first and second connecting materials being different than one another.

A connection in which the material which forms the cohesive join is substantially directly exposed to the flow of the first fluid is to be understood as meaning a connection in which the connecting material is acted on directly by the first fluid, in particular in which the first fluid impinges directly on the connecting material or flows directly past it.

The heat exchanger according to the invention allows the connecting material of the respective cohesive connection to be adapted to the prevailing conditions, and in particular the requirements placed on the respective connection with regard to strength, elasticity, temperature, oxidation and/or corrosion resistance. Those subregions of the heat exchanger in which these demands are not especially high can therefore be joined using connecting materials which are often significantly less expensive, whereas connections in regions of the heat exchanger which are exposed to high demand with regard to corrosion, oxidation, temperature, strength and/or elasticity are produced using connecting materials which satisfy the demands in such respects. An additional advantageous factor may be that the use of Cu solder also encompasses wide soldering gaps between the components to be connected, i.e. the components that are to be joined can be manufactured with larger tolerances.

In a preferred embodiment of the present invention, the fourth delimiting element is connected in a sealing manner to the first and/or second delimiting element or a further separating element; in this case too, it is preferable for the connection to be carried out using the first or second connecting material.

If, for example, the fourth delimiting element is cohesively connected to the first or second delimiting element or a further separating element in such a manner that the material which forms the cohesive join is not or not directly exposed to the flow of the first fluid, for example is only exposed to the flow of the first fluid indirectly through diffusion, swirling flow or the like, according to the invention it is possible for this connection of the fourth delimiting element to the first or second delimiting element or a further separating element to be produced using the second connecting material, since the connecting material is not in this case subject to particularly high demands.

It is particularly preferable for the first and/or second delimiting elements to substantially close off the first or second flow path with respect to the environment and with respect to the respective other flow path, so that a transfer of the first fluid into the second flow path or of the second fluid into the first flow path is prevented even in the region of the delimiting elements, and in particular the first and/or second fluid is prevented from escaping from the heat exchanger.

It is in this way also possible for the apparatus according to the invention for exchanging heat to be used in an arrangement in which a pressure which is higher than the surrounding environment is present in the first and/or second flow path.

In a preferred embodiment, the first delimiting element, in its main direction of extent, runs substantially parallel to the main direction of extent of the second delimiting element. In this case, it is particularly preferable for the first delimiting element to be arranged at least partially inside the second delimiting element.

In a further embodiment, the first delimiting element is arranged at least partially inside the second delimiting element, with the main direction of extent of the first delimiting element, and in particular the direction of flow of the first fluid, not being parallel to the main direction of extent of the second delimiting element and in particular to the direction of flow of the second fluid.

It is preferable for the direction of flow of the first fluid inside the first delimiting element to run at least partially parallel or parallel but in the opposite direction to the direction of flow of the second fluid inside the second delimiting element.

In a particularly preferred embodiment of the present invention, the first and/or second delimiting element is a tube which particularly preferably at least in part has a substantially rectangular, square, circular or elliptical cross section, the cross section of the second delimiting element being larger, preferably by a multiple, than the cross section of the first delimiting element.

It is preferable for the separating element to be a tube plate which is provided with openings into which the first delimiting elements are fitted. It is preferable for the openings in the tube plate to have cross sections which substantially correspond to the cross section of the first delimiting element, so that the separating element surrounds the first delimiting element in a substantially positively locking manner preferably in an end portion.

The separating element is preferably surrounded in a substantially positively locking manner by a subregion of the second delimiting element, particularly preferably by an end portion of the second delimiting element. In a further embodiment, the separating element bears at its end against the second delimiting element. In a further embodiment, the separating element surrounds the second delimiting element in a substantially positively locking manner at the end side.

In one embodiment of the present invention, the third and/or fourth delimiting element is/are connected in a sealing manner, in particular cohesively, to the first or second connection piece, respectively. It is preferable for the material which forms the cohesive join in the case of the cohesive connection of the third or fourth delimiting element to the first or second connection piece also to be the first or second connecting material.

In a particularly preferred embodiment of the present invention, the second delimiting element is connected in a sealing manner to the third or fourth connection piece, in particular by a cohesive connection using the second connecting material. It is assumed that the material which forms the cohesive join of the cohesive connection between the third and fourth connection piece and the second delimiting element is not directly exposed to the second fluid, in which case the second connecting material is selected in such a way that it is able to withstand a possible oxidizing or corrosive effect of the second fluid substantially unaffected.

It is preferable for the first fluid to be at a higher temperature than the second fluid, the first fluid preferably being a gas, in particular an exhaust gas from a combustion process and particularly preferably the exhaust gas from a motor vehicle engine. It is preferable for the temperature of the first fluid when it enters the heat exchanger to be higher than the temperature of the second fluid when it enters the heat exchanger, preferably 100° C. to 1000° C. higher than the temperature of the second fluid, for preference 300° C. to 900° C. above the temperature of the second fluid and particularly preferably 500° C. to 800° C. above the temperature of the second fluid.

The second fluid is preferably a liquid, preferably a refrigerant, and particularly preferably cooling water, in particular the cooling water of a motor vehicle cooling circuit.

It is particularly preferable for the corrosion resistance, oxidation resistance and/or thermal stability of the first connecting material to be higher than the corrosion resistance, oxidation resistance and/or thermal stability of the second connecting material. In particular, the corrosion resistance of the first connecting material with respect to moisture, sulfur compounds, carbon compounds and in particular acids thereof is higher than that of the second connecting material.

The cohesive connections of a heat exchanger apparatus according to the present invention are preferably connections which are produced by soldering, preferably brazing and particularly preferably by high-temperature soldering. In this case, it is preferable for the first connecting material to be selected from the group consisting of nickel solder (Ni solder), gold solder (Au solder), cobalt solder (Co solder) and the like. In particular, the group from which the first connecting material is selected also encompasses further solders which contain alloys of the metals nickel (Ni), silver (Ag), gold (Au) or cobalt (Co), these metals representing a significant constituent of the alloys in question.

A particularly preferred nickel solder, in addition to nickel as a significant constituent, also contains, as further constituents, 0-25% by weight chromium, 0-10% by weight silicon, 0-85% by weight boron, 0-11% by weight phosphorus. Moreover, further nickel solders also contain 0-4.5% by weight iron and 0-16% tungsten. Examples of particularly preferred nickel solders include the solders Ni102, Ni105 or Ni107.

A preferred gold solder consists of 100% by weight gold, in particular if the layer of solder has been applied chemically. Further gold solders contain up to 20% by weight nickel.

The second use material is preferably selected from a group of materials consisting of copper solder (Cu solder), silver solder (Ag solder), brass solder and the like. In particular, the group from which the second connecting material is selected also includes further solders which contain alloys of the metals copper (Cu), zinc (Zn) or silver (Ag), these metals representing a significant constituent of the alloy in question.

A particularly preferred copper solder consists of 100% by weight copper, with further Cu solders, to which up to 3% by weight nickel has been admixed, preferably also being used. Further copper solders contain up to 15% by weight nickel and/or up to 47% by weight zinc and/or up to 17% by weight Sn and/or up to 13% P. Solders of this type are also known as brass solders.

The process according to the invention for producing an apparatus according to the invention for exchanging heat achieves the object by virtue of the fact that the delimiting elements and the separating elements (components) are cohesively connected to one another in a single joining process.

Therefore, in this joining process both the cohesive connections which are produced using the first connecting material and the cohesive connections which are produced using the second connecting material are produced in a single joining process, with the parameters of the joining process being selected in such a way as to effect reliable and permanent connection of the components.

According to the invention, the elements, i.e. the separating elements and/or at least one of the delimiting elements, prior to the joining process are provided at least in regions with the first and/or second connecting material; in particular, the connecting materials are applied to the contact regions of the components, i.e. the contact regions between the separating elements and the delimiting elements, and if appropriate the connection pieces.

It is preferable for the connecting materials to be applied by spreading, rolling or spraying on the connecting material, in particular by applying an adhesive followed by a soldering powder, a paste, a foil or a strip or by electrodeposition of the connecting material or a thermal spraying process.

Connecting regions in which in the fully joined heat exchanger the material which forms the cohesive join is directly exposed to the flow of the first fluid are in this case provided with the first connecting material, whereas connecting regions in which the material which forms the cohesive join in the fully joined heat exchanger is not or not directly exposed to the flow of the first fluid are provided with the second connecting material.

Prior to the joining process, the components provided with the connecting material are connected to one another in a positive and/or nonpositive manner, in such a manner that their arrangement with respect to one another substantially corresponds to the arrangement of the components in the fully joined heat exchanger. The components which are positively and/or nonpositively connected to one another are then fed to the joining process.

During the joining process, the components which have been provided with the connecting materials, in particular the separating elements and the delimiting elements, are exposed to a temperature of between 900° C. and 1300° C., preferably between 1000° C. and 1200° C., and particularly preferably between 1050° C. and 1150° C., for a predetermined period of time. As a result, during the joining process, the connecting material which has been applied to the elements of the heat exchanger device changes in such a way that the connecting materials melt and as a result the components are cohesively connected to one another in a sealing manner.

In a particularly preferred embodiment of the present invention, the joining process takes place under a shielding gas atmosphere, in which case the shielding gas is selected from a group of gases consisting of hydrogen gas ($H_2$), nitrogen gas ($N_2$), argon (Ar), krypton (Kr), xenon (Xe) and the like, as well as any desired combinations thereof.

On account of the shielding gas atmosphere during the joining process, an undesirable change to the surface or the structure of the connecting material and/or of the components, for example through oxidation, can be avoided, and as a result the quality of the connection, in particular the strength and durability of the connection, can be ensured.

Within the context of the process for producing the heat exchanger apparatus according to the invention, it is particularly preferable for the joining process to be carried out continuously, i.e. the components which have been positively and/or nonpositively connected to one another are heated for example in a continuous furnace, a walking-beam furnace or the like. It is in this way possible to avoid delays during production of a heat exchanger according to the invention on account of the in some cases long process times of a high-temperature soldering process in a vacuum furnace. A continuous joining process of this type is positively influenced in particular by the use of a shielding gas during the joining in a continuous furnace.

BRIEF DESCRIPTION OF THE DRAWINGS

Further features of the present invention will emerge from the following detailed description of a particularly preferred embodiment in conjunction with the drawing, in which:

FIGS. 1 to 3 show heat exchangers according to the invention in particular for use as exhaust-gas heat exchangers in a motor vehicle.

DETAILED DESCRIPTION

Figure 1:
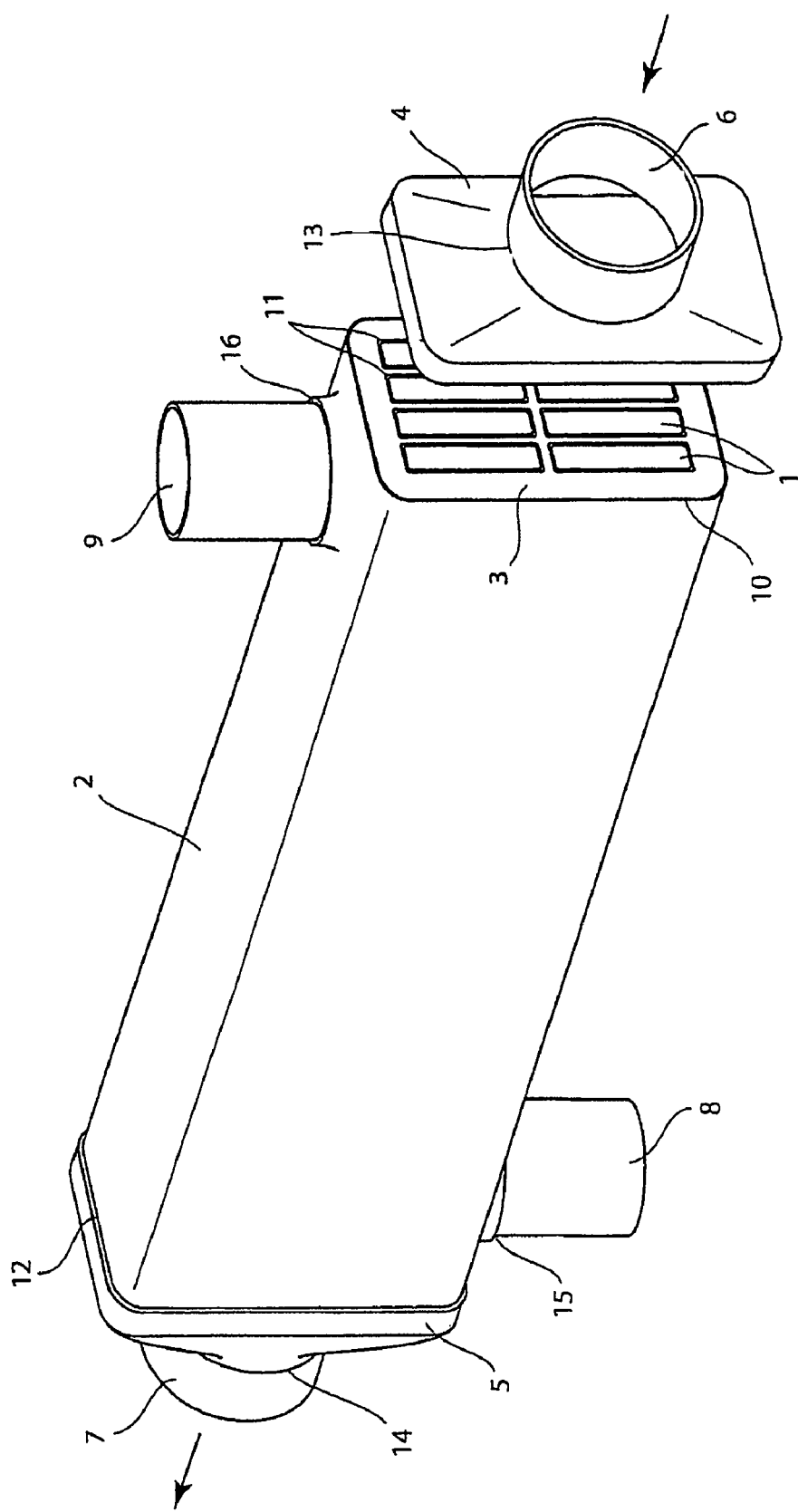
FIG. 1 shows an exploded view of a heat exchanger according to the invention.

The heat exchangers have first delimiting elements 1, through which a hot exhaust gas flows, and a second delimiting element 2, through which a liquid coolant flows. The delimiting elements 1 run substantially parallel to the main direction of extent of the delimiting element 2 (not illustrated) and are arranged inside the delimiting element 2. At the heat exchangers shown in FIGS. 1 and 2, the exhaust gas enters the first delimiting elements 1 from the right and emerges to the left or upward, respectively.

The separating element 3 is arranged substantially orthogonally to the main direction of extent of the second delimiting element 2. In a front end region, the separating element 3 is connected in a sealing manner to the second delimiting element 2, the sealing connection being formed by a cohesive connection 10 using the first or second connecting material.

The separating element 3 has openings which substantially correspond to the cross sections of the first delimiting elements 1 and into which the first delimiting elements 1 are fitted, so that they are each surrounded, in a substantially positively locking manner, by the separating element 3 in one of their end regions. The first delimiting elements 1 are connected to the separating element 3 in a sealing manner in their end regions, the sealing connection being formed by a cohesive connection 11 using the first connecting material, since the cohesive connection 11 is exposed to the full temperature of the exhaust gas and the corrosive action of the exhaust-gas condensate.

In the region of the rear end, at the opposite end from the separating element 3, of the second delimiting element 2, the heat exchanger apparatus shown has a further separating element (not shown), the further separating element preferably being surrounded in a substantially positively locking manner in a similar way to in the front region, by the end region of the second delimiting element 2 and being connected thereto in a sealing manner by a cohesive connection. Similarly to in the front region of the heat exchanger, there is a sealing connection between the first delimiting elements 1 and the further separating element in the rear end region of the first delimiting elements 1, the connection being made to the further separating element (not shown), which surrounds them in a substantially positively locking manner.

Figure 2:
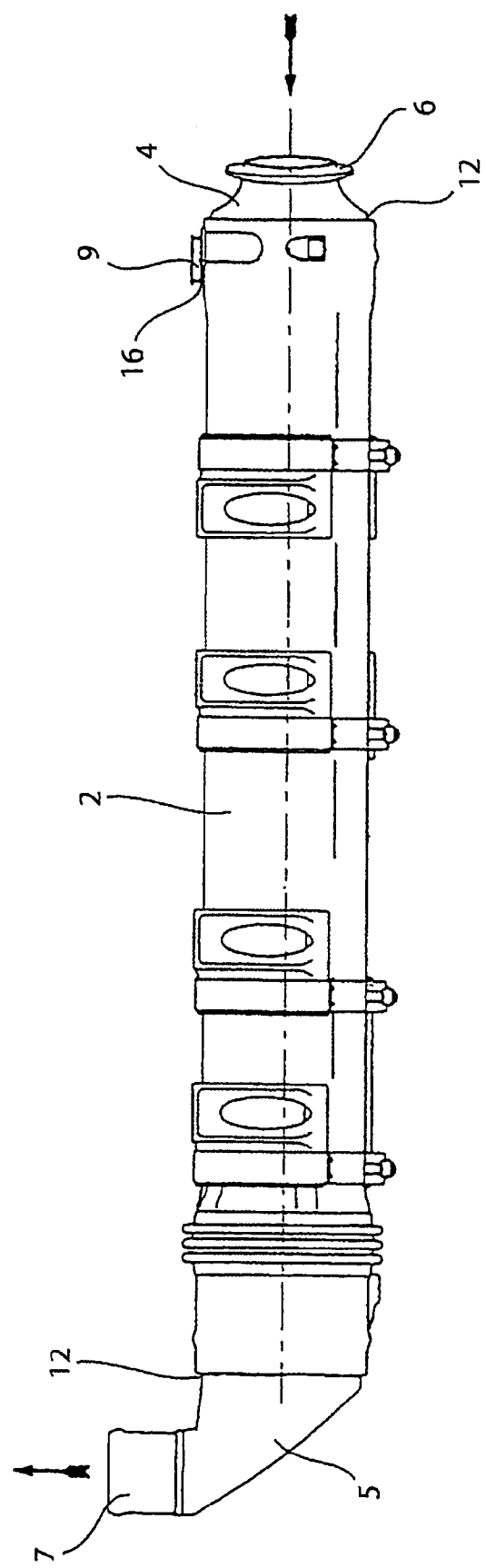
FIG. 2 shows a side view of a further embodiment of a heat exchanger according to the invention.
Figure 3:
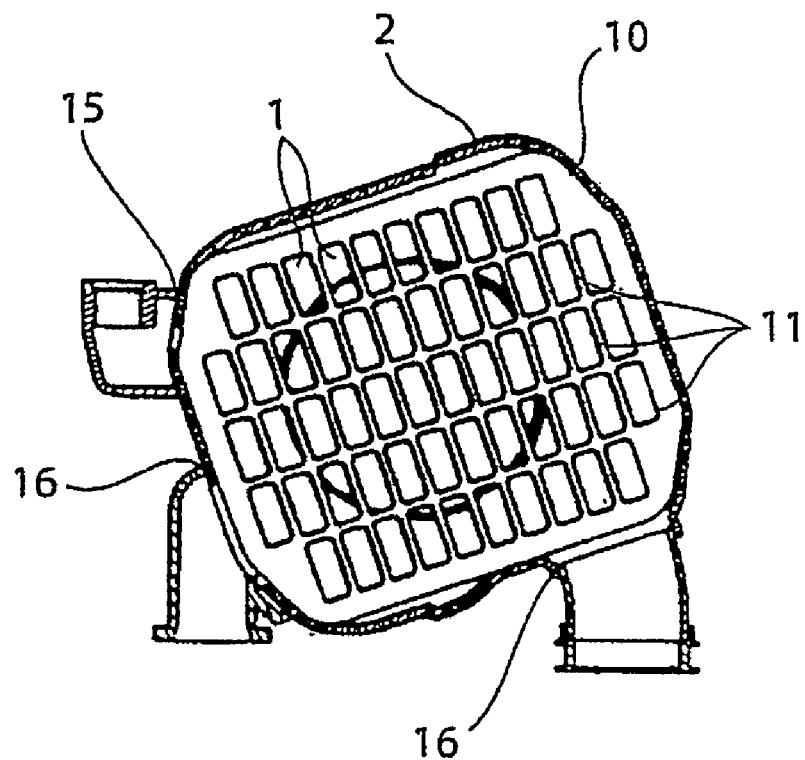
FIG. 3 shows a sectional view of a heat exchanger as shown in FIG. 2.

In their rear regions, the heat exchangers shown in FIGS. 1 and 2 have a fourth delimiting element 5. Between the fourth delimiting element 5 and the second delimiting element 2 there is a sealing connection which is formed in a cohesive connection 12.

Depending on the strength of the corrosive and/or oxidizing action of the exhaust gas flowing through the first delimiting elements 1 on the connecting materials of the cohesive connections between the respective separating elements, the delimiting elements and the respective connection pieces, and depending if appropriate on whether and to what extent the connecting materials of the cohesive connections are exposed to the exhaust-gas condensates, these cohesive connections may be produced using the first and/or second connecting material.

In the region of the cohesive connection 12 between the fourth delimiting element 5 and the second delimiting element 2, the connecting material which forms the cohesive join is exposed to exhaust gas which has already cooled down, and consequently this sealing connection can be made using the second connecting material. However, since the corrosive action of the exhaust-gas condensate may still be present, here too it is preferable to use the first connecting material.

FIG. 1 shows the third delimiting element 4 in the form of an illustration which is taken from the second delimiting element 2. The third delimiting element 4 touches the end region of the second delimiting element 2 in a substantially positively locking manner; it is cohesively connected in a sealing manner to the second delimiting element 2 by the joining process. Depending on the extent to which the material which forms the cohesive join in the region of the connection between the third delimiting element 4 and the second delimiting element 2 is exposed to the exhaust gas, the cohesive connection 12 between the third delimiting element 4 and the second delimiting element 2 is produced using the first or second connecting material.

The third delimiting device 4 and the fourth delimiting device 5 are connected in a sealing manner to first and second connection flanges 6, 7. The sealing connection between the first and second connection pieces 6, 7 and the third or fourth delimiting element 4, 5 is formed as a cohesive connection 13 or 14, respectively. The cohesive connections 13 and 14 may be welded or soldered; in the latter case, it is preferable to use the second connecting material for cost reasons and because the connections are not directly exposed to the flow of the first fluid.

In its rear, lower region and in its front, upper region, the second delimiting element 2 has third and fourth connection pieces 8 and 9, respectively, which are connected in a sealing manner to the second delimiting element 2. The sealing connections between the connection pieces 8, 9 and the second delimiting element 2 are designed as cohesive join 15, 16, the material which forms the cohesive join being the second connecting material, since it is not exposed to the flow of the exhaust gas, and therefore there are no particularly high demands as regards resistance to corrosion and/or oxidation imposed on the connecting material in the region of the connections 15, 16.

The exhaust gas which flows through the heat exchanger flows through the connection piece 6, which is connected to the third delimiting element 4, into the first diffusor space, which is formed by the third delimiting element, and then out of this first diffusor space through the first delimiting elements 1, which are designed in the form of rectangular tubes. After the exhaust gas has flowed through the first delimiting elements 1 along first flow paths, in the rear region of the heat exchanger it passes into the second diffusor chamber, which is delimited by the fourth delimiting element 5, and it then flows out of the second diffusor chamber through the second connection flange 7.

The coolant at least partially flows through the heat exchanger illustrated in a direction of flow which is substantially parallel or parallel but opposite to the direction of flow of the exhaust gas.

In the situation in which the coolant flows parallel to the exhaust gas, the coolant flows through the fourth connection piece 9, which is flow-connected to the second delimiting element 2, into the second flow path, which is delimited by the second delimiting element, and then back out of this second flow path through the third connection piece 8.

If the coolant flows parallel but opposite to the exhaust gas, the coolant flows into the second flow path through the third connection piece 8. In the front region of the heat exchanger, the coolant, after it has taken up heat from the exhaust gas as it flows through the second delimiting element, emerges again from the second flow path through the fourth connection piece 9, which is flow-connected to the second delimiting element 2.

The invention claimed is:

1. An apparatus for exchanging heat having:
   a) at least one first flow path for a first fluid, which is at least partially delimited by at least one first delimiting element;
   b) at least one second flow path for a second fluid, which is at least partially delimited by at least one second delimiting element;
   c) at least one first diffusor space, which is at least partially delimited by at least one third delimiting element and is connected upstream of the first flow path, the first diffusor space being flow-connected to at least one first connection piece, through which a flow of the first fluid enters the first diffusor space;
   d) at least one second diffusor space, which is at least partially delimited by at least one fourth delimiting element and is connected downstream of the first flow path, the second diffusor space being flow-connected to at least one second connection piece, through which the first fluid flows out of the diffusor space;
   e) at least one third and one fourth connection piece, which are flow-connected to the second flow path and through which the second fluid is fed to and discharged from the second flow path;
   f) at least one separating element, which substantially prevents the first fluid from entering the second flow path and/or the second fluid from entering the first flow path;
   g) the separating element being connected in a sealing manner to the first and second delimiting elements, and the third delimiting element being connected in a sealing manner to the first or second delimiting element and/or the separating element;
   h) exchange of heat taking place between the first fluid and the second fluid,
   wherein said flow comprises a direct flow when said flow enters said at least one first diffuser space from said first connection piece before it is diverted by a structure in the apparatus for exchanging heat and an indirect flow after said flow is diverted by the structure in the apparatus for exchanging heat,
   wherein the sealing connections are cohesive connections, at least the connections in which the material forming the cohesive join is contacted by said direct flow comprising a first connecting material, and
   connections in which the material which forms the cohesive join is contacted by said indirect flow and not contacted by said direct flow comprising a second connecting material, and the compositions of the first and second connecting materials being different than one another.

2. The apparatus for exchanging heat as claimed in claim 1, wherein
the fourth delimiting element is connected in a sealing manner to the first or second delimiting element and/or a further separating element.

3. The apparatus for exchanging heat as claimed in claim 1, wherein
the first and/or second delimiting elements substantially close off the first and/or second flow path with respect to the environment.

4. The apparatus for exchanging heat as claimed in claim 1, wherein
the main direction in which the first delimiting element extends runs substantially parallel to the main direction in which the second delimiting element extends.

5. The apparatus for exchanging heat as claimed in claim 1, wherein
the first delimiting element is arranged at least partially inside the second delimiting element in the second flow path.

6. The apparatus for exchanging heat as claimed in claim 1, wherein
the separating element is a tube plate, and the first and second delimiting elements are each a tube.

7. The apparatus for exchanging heat as claimed in claim 1, wherein
the first delimiting element is surrounded by the separating element at least in regions.

8. The apparatus for exchanging heat as claimed in claim 1, wherein the separating element is surrounded at least by an end portion of the second delimiting element, or rests against it at the end side, or in that the separating element surrounds at least the end portion of the second delimiting element.

9. The apparatus for exchanging heat as claimed in claim 1, wherein the third delimiting element and/or the fourth delimiting element is/are connected cohesively to the first or second connection piece.

10. The apparatus for exchanging heat as claimed in claim 1, wherein the third and/or fourth connection piece is connected to the second delimiting element in a sealing manner using the second connecting material.

11. The apparatus for exchanging heat as claimed in claim 1, wherein the first fluid is at a higher temperature than the second fluid.

12. The apparatus for exchanging heat as claimed in claim 1, wherein the first fluid is an exhaust gas from a combustion process.

13. The apparatus for exchanging heat as claimed in claim 1, wherein
the second fluid is a refrigerant or cooling water.

14. The apparatus for exchanging heat as claimed in claim 1,
wherein the first connecting material is more resistant to corrosion and/or oxidation than the second connecting material.

15. The apparatus for exchanging heat as claimed in claim 1, wherein
the cohesive connection is produced by brazing or high-temperature soldering.

16. The apparatus for exchanging heat as claimed in claim 1 wherein
the first connecting material is selected from a group consisting of nickel solder (Ni solder), gold solder (Au solder), cobalt solder (Co solder), and solders which contain alloys of the metals nickel (Ni), silver (Ag), gold (Au) or cobalt (Co), these metals representing a significant constituent of the alloy in question.

17. The apparatus for exchanging heat as claimed in claim 1 wherein
the second connecting material is selected from a group of materials consisting of copper solder (Cu solder), silver solder (Ag solder), brass solder and solders which contain alloys of the metals copper (Cu), zinc (Zn) or silver (Ag), these metals representing a significant constituent of the alloy in question.

18. A process for producing the apparatus for exchanging heat as claimed in claim 1, wherein
a) the separating element, the delimiting elements and the connection pieces, are cohesively connected to one another in a single joining process;
b) the separating element and/or at least one of the delimiting elements, prior to the joining process, being provided at least in regions with the first and/or second connecting material; and
c) the separating element and the delimiting elements, and also the connection pieces, being positively and/or non-positively connected to one another prior to the joining process and then being fed to the joining process.

19. The process for producing an apparatus for exchanging heat as claimed in claim 18, wherein the separating element and the delimiting elements, during the joining process, are exposed to a temperature of between 1000° C. and 1200° C. for a predetermined period of time.

20. The process for producing an apparatus for exchanging heat as claimed in claim 18, wherein
the apparatus for exchanging heat, for the purpose of the joining process, is moved through at least one heated zone by means of a conveyor mechanism.

21. The process for producing an apparatus for exchanging heat as claimed in claim 18,
wherein the joining process takes place under a shielding gas atmosphere, the shielding gas being selected from a group of gases consisting of $H_2$ (hydrogen gas), $N_2$ (nitrogen gas), Ar (argon), Kr (krypton), Xe (xenon) and the like, as well as any desired combinations thereof.

* * * * *